United States Patent
Schwarz et al.

(10) Patent No.: US 11,534,860 B2
(45) Date of Patent: Dec. 27, 2022

(54) METHOD FOR IDENTIFYING JOINING POINTS OF WORKPIECES AND LASER MACHINING HEAD COMPRISING A DEVICE FOR CARRYING OUT THIS METHOD

(71) Applicant: Precitec GmbH & Co. KG, Gaggenau (DE)

(72) Inventors: Joachim Schwarz, Kleinandelfingen (CH); Rüdiger Moser, Malsch (DE); David Blázquez-sánchez, Gaggenau (DE)

(73) Assignee: PRECITEC GMBH & CO. KG, Gaggenau (DE)

( * ) Notice: Subject to any disclaimer, the term of this patent is extended or adjusted under 35 U.S.C. 154(b) by 194 days.

(21) Appl. No.: 16/485,139

(22) PCT Filed: Feb. 12, 2018

(86) PCT No.: PCT/EP2018/053424
§ 371 (c)(1),
(2) Date: Aug. 9, 2019

(87) PCT Pub. No.: WO2018/146303
PCT Pub. Date: Aug. 16, 2018

(65) Prior Publication Data
US 2020/0038993 A1 Feb. 6, 2020

(30) Foreign Application Priority Data
Feb. 13, 2017 (DE) .......................... 102017102762.9

(51) Int. Cl.
*B23K 26/044* (2014.01)
*B23K 26/00* (2014.01)
(Continued)

(52) U.S. Cl.
CPC .......... *B23K 26/044* (2015.10); *B23K 9/1274* (2013.01); *B23K 26/0006* (2013.01);
(Continued)

(58) Field of Classification Search
CPC .......... G05B 2219/37053; B23K 26/04; B23K 26/042; B23K 26/24; B23K 26/26;
(Continued)

(56) References Cited

U.S. PATENT DOCUMENTS

| | | | |
|---|---|---|---|
| 4,918,284 A | 4/1990 | Weisz | |
| 7,236,255 B2* | 6/2007 | Kodama | B21C 37/0811 219/121.64 |

(Continued)

FOREIGN PATENT DOCUMENTS

| | | |
|---|---|---|
| CN | 101400474 A | 4/2009 |
| CN | 101528403 A | 9/2009 |

(Continued)

OTHER PUBLICATIONS

Machine English Translation of DE-102007027377-A1 (Year: 2008).*
(Continued)

*Primary Examiner* — Sang Y Paik
*Assistant Examiner* — Erwin J Wunderlich
(74) *Attorney, Agent, or Firm* — Dinsmore & Shohl LLP

(57) ABSTRACT

A method for identifying joining positions of workpieces includes capturing images of a joint by a camera, determining measurement data for the joining positions associated with a course of the joint from the images of the joint, determining a mathematical model of the joint course from a part of the measurement data, providing a curve based on the mathematical model for positioning a welding laser during a laser welding process along the curve.

19 Claims, 7 Drawing Sheets

(51) Int. Cl.

| | | |
|---|---|---|
| *B23K 26/03* | (2006.01) | |
| *B23K 31/12* | (2006.01) | |
| *G01B 11/14* | (2006.01) | |
| *G01B 11/24* | (2006.01) | |
| *B23K 9/127* | (2006.01) | |
| *B23K 26/06* | (2014.01) | |

(52) U.S. Cl.
CPC ........ *B23K 26/032* (2013.01); *B23K 26/0648* (2013.01); *B23K 31/125* (2013.01); *G01B 11/14* (2013.01); *G01B 11/24* (2013.01)

(58) Field of Classification Search
CPC .......................... B23K 26/032; B23K 26/044; B23K 26/0006; B23K 26/0648; B23K 31/125; G01B 11/14; G01B 11/24; G01B 11/26; G01B 11/00
USPC .................................... 219/121.64
See application file for complete search history.

(56) References Cited

U.S. PATENT DOCUMENTS

| | | | | |
|---|---|---|---|---|
| 8,546,721 | B2 * | 10/2013 | Hesse | .................... B23K 26/04 |
| | | | | 219/121.64 |
| 2015/0375344 | A1 | 12/2015 | Adcock et al. | |
| 2016/0193681 | A1 * | 7/2016 | Pesme | .................. B23K 9/0956 |
| | | | | 219/130.01 |

FOREIGN PATENT DOCUMENTS

| | | | | |
|---|---|---|---|---|
| CN | 201408286 Y | * | 2/2010 | ............. B23K 26/70 |
| CN | 103857490 A | | 6/2014 | |
| CN | 104972229 A | | 10/2015 | |
| CN | 204747769 U | | 11/2015 | |
| DE | 102004001168 A1 | | 8/2005 | |
| DE | 102007027377 A1 | * | 1/2008 | ........... B23K 26/044 |
| DE | 102011012729 A1 | | 9/2012 | |
| DE | 102011078276 B3 | | 12/2012 | |
| DE | 102011104550 A1 | | 12/2012 | |
| DE | 102013017795 B3 | | 2/2015 | |
| EP | 2022595 A1 | | 2/2009 | |
| EP | 2886239 A1 | | 6/2015 | |
| WO | 2003041902 A1 | | 5/2003 | |
| WO | 2005095043 A1 | | 10/2005 | |
| WO | 2007053973 A1 | | 5/2007 | |
| WO | 2007088122 A1 | | 8/2007 | |
| WO | 2008028580 A1 | | 3/2008 | |

OTHER PUBLICATIONS

Stache, Nicolaj and Thi Porn Nguyen; "Precise Laser Welding by Automatic Adaptation to the Work Piece Positioning Error;" May 27, 2008; Institute of Imaging and Computer Vision; Proceedings of the 12th International Student Conference on Electrical Engineering 2008; pp. 1-7 (Year: 2008).*
Machine English Translation of CN-201408286-Y (Year: 2010).*
International Search Report dated Jun. 26, 2018; International Application No. PCT/EP2018/053424.
China Search Report; Chinese Patent Application No. 201880011737.X.

* cited by examiner

METHOD FOR IDENTIFYING JOINING POINTS OF WORKPIECES AND LASER MACHINING HEAD COMPRISING A DEVICE FOR CARRYING OUT THIS METHOD

CROSS-REFERENCE TO RELATED APPLICATIONS

This application is the U.S. national stage of PCT/EP2018/053424 filed Feb. 12, 2018, which claims priority of German Patent Application 102017102762.9 filed Feb. 13, 2017 of which both are hereby incorporated in its entirety.

FIELD OF THE INVENTION

The invention relates to a method for identifying joining positions of workpieces and a laser machining head comprising a device for carrying out this method.

BACKGROUND OF THE INVENTION

In joining processes, in particular in laser welding processes, in which the joining position must be precisely determined for positioning a welding laser at the joining position, for example, the problem often arises that the visualization of the joining gap via an imaging optic and the established triangulation method do not allow for reliable detection of the joining position. At the joining position, the joining gap often has no geometric shape that would be reflected in a triangulation line. Additional external lighting may often not be installed due to the available space and the pollution caused by the welding process.

In many cases, the location of the joining positions must be identified before welding, for example in order to unload the component before welding in case of incorrect positioning. In many cases, the variations of the components, i.e., their tolerances in connection with the clamping device, do not allow the components to be welded without controlling the joining position. When the component costs are high, the joining position is thus measured over the entire length, for example, over a complete revolution, in order to then control the welding laser in such a way that it is guided along this recorded curve. For assessing the quality of the joining positions or the joining seam as well as for driving the welding laser, outliers must necessarily be avoided. However, the unreliable detection of the joining gap position in a frame often results in a measurement curve with many outliers and gross errors.

Measurement curves strongly contaminated with so-called outliers do not allow the welding laser to be driven with the recorded positions after measuring a component.

As schematically illustrated in FIG. 1a, in a conventional method for identifying joining positions of workpieces by means of a triangulation method, a triangulation line 2 is projected onto a joining gap 3 between two workpieces 4 and 5 by means of a laser and is recorded by a suitable sensor, for example a camera, in order to detect the joining position 6 as an interruption of the triangulation line 2.

In FIG. 1b, an image taken from a triangulation line projected over a joining gap 3 is shown. In particular, when the two workpieces have different reflective properties, it is virtually impossible to detect the actual joining gap. In FIG. 1b, virtually no evaluable signal is obtained for the component on the right-hand side in the image, so that the joining gap itself, i.e., the joining position, which is marked in FIG. 1b by a circle pointed out by the arrow F, is virtually not identifiable.

If, instead of a triangulation method with a laser line over the joining gap, a greyscale image of the workpieces with the joining gap 3 is used, wherein the camera captures the region of interest (ROI) 7, as indicated in FIG. 2a, in order to detect the joining gap 6, a gray image as shown in FIG. 2b is created.

The joining gap 3 can be identified here. However, even with incident light illumination, outliers, i.e., erroneous measured values, which in no way correspond to the position of the joining gap, i.e., the joining position, may arise in the detection when the joining gap closes or when the reflection properties of the workpieces change.

If the joining position of the joining gap is detected from a gray scale image, as shown in FIG. 2b, over its entire length, i.e., over 360 degrees in the illustrated example, the acquired measurement data, as shown in FIG. 3, not only includes outliers 8 but also regions 9 in which the position has not been identified. Thus, it is difficult to reliably and safely determine the course of the joining point from the measurement data as shown in FIG. 3.

The welding head YW52 from Precitec GmbH & Co. KG is provided with triangulation lasers for detecting the joining gap and for measuring the seam bead. If the joining gap has a significant geometric feature, e.g., a sufficiently large bevel, the joining gap can be detected in the triangulation line. Outliers in the measured data are reduced with smoothing filters and simple limits.

In the seam inspection system SOUVIS® 5000 from Precitec GmbH & Co. KG, two triangulation lines are projected transversely with respect to the seam at an angle thereto observed by a camera to detect the joining positions and the seam bead. In addition, a high-resolution gray image of the seam is captured simultaneously. Geometric changes along the triangulation lines, changes in brightness of the triangulation lines and brightness differences in the gray image are used to determine the joining positions. Furthermore, the gray image is also evaluated. The measured values are smoothed and outliers beyond limits to be defined are eliminated.

WO 03/041902 A1 describes a method and a device for evaluating joints and workpieces. For evaluating the position and quality of joints, a combined image of the joint with a gray image and a laser line projected onto the joint is captured. The position of a welding seam is detected and the subsequent inspection of the seam is carried out.

WO 2008/028580 A1 describes a method and a device for optically assessing welding quality during welding. Using the camera, images of the process and a subsequent triangulation line are captured and used to assess the quality. Furthermore, xenon flash lighting, LED lighting and laser diodes for illuminating a portion of a workpiece to be received are mentioned.

WO002007 053973 describes a method and a device for assessing joints. Herein, triangulation line and gray scale images are captured before and after the welding process with a sensor using camera technology with asynchronous ROI (Region of Interest) technology and evaluated.

DE 10 2011 104550 relates to a measuring device for monitoring a joining seam, a joining head and a laser welding head therewith. Herein, an optical measuring device is described which simultaneously allows for a fast 3D measurement of the joint seam and the identification of small local defects.

WO 2005 095043 A1 relates to a laser machining head and a joining method. In this case, the measurement of the joint and the measurement of the seam bead are performed by means of two sensors provided in the laser machining head which detect the projected laser lines onto the workpiece.

DE10 2011 078 276 B3 relates to a method for identifying defects in a welding seam during a laser machining process and a laser machining device. Herein, in a laser welding head with joint spot tracking (seam guiding), radiation emitted or reflected from the side of the workpiece is recorded by means of a two-dimensionally spatially resolving detector. The intensity of the detected radiation along a detection field section or profile section along the seam bead corresponding to the pixel brightness of an image captured by the CMOS camera has, in the region of the solidifying melt, a characteristic profile which can be described, for example, by means of an exponential function. The fitting coefficients of the exponential function are characteristic for the heat transport into the workpiece and may be used to detect defects in the weld seam DE 10 2011 012 729 A1 relates to an optical testing method by means of intensity profile and describes an offline testing method wherein recordings of laser triangulation lines are evaluated.

EP 2 886 239 A1 describes a machining head having a housing through which a work laser beam path with collimating optics and focusing optics is directed. An observation device includes an image sensor for capturing images of a joining location of workpieces. The viewing beam path of the observation device is coaxially coupled in by means of a dichroic beam splitter in the work beam path. Furthermore, an illumination laser is provided, the illumination beam path of which being coaxially coupled into the viewing beam path and into the work laser beam path. The captured frames or their regions of interest are subjected to image machining to identify the butt joint from a gradient image. This also applies to the capillary (key hole) or its position. The relative position between capillary and butt joint is used for controlling the machining path.

WO 2007/088122 A1 relates to a laser beam welding head and describes that it is known to identify outliers in measured data as errors and to "computationally eliminate" them.

EP 2 022 595 A1 relates to a method and a device for adjusting a machining position and describes the interpolation between two points by means of a straight line in order to use a distance of an actual position from the interpolation line for seam tracking.

SUMMARY OF THE INVENTION

Based on the above, the object of the invention is to provide a method for identifying joining positions of workpieces and a laser machining head comprising a device for carrying out this method such that reliable detection of joining gap positions without outliers and gross errors can be performed.

This object is achieved by the method and the laser machining head of embodiments disclosed herein. Advantageous embodiments and further developments of the invention are also described.

According to the invention, for the purpose of detecting joining positions of workpieces from camera images such as gray images of a joint, measurement data for the position for the joint are determined, which reflect the course of the joint. From a part of these measurement data, a model of the joint course fitted to the original measurement data is determined that is output as a measurement curve for controlling a joining process and/or for determining further quality characteristics. According to the invention, therefore, not the original measurement data are used to determine the joining position and based on this quality characteristics, such as maximum deviation or concentricity, but the data from a model fitted to the original measurement data, so that no outliers in the original measurement data affect the evaluation of the joining positions.

In order to obtain as high-contrast images of the joint as possible and the smallest possible mechanical interference contour, the workpieces are to be illuminated coaxially with respect to the viewing beam path of the camera.

An advantageous development of the invention is characterized in that the viewing beam path of the camera for capturing the images of the joint is coaxially coupled into a work laser beam path. In this way, the joint can be observed directly from above to determine the joining positions.

In an advantageous development of the invention, measurement data are to be incrementally removed from the measurement data associated with the course of the joint in a manner depending on the component, and the model of the joint course is determined from the remaining measurement data, wherein the component-dependent removal of measurement data from measurement data associated with the course of the joint is carried out according to a comb profile, in which the width of the windows and their distances are selected according to the workpieces.

Since the course of the joint is known, the component-dependent reduction of the measurement data allows for the determination of the model for the joint course to be simplified.

In order to have measurement data available for the entire course of the joint, according to another embodiment of the invention, unidentified joining positions in the course of the joint can be supplemented by linear interpolation.

A preferred embodiment of the invention is characterized in that the model of the joint course is determined by repeatedly removing data from the measurement data, for example by moving a comb profile with fixed width and adjusting the model to the remaining measurement data.

By repeatedly determining a model and respectively determining the number of outliers for this model, it is possible to fit the best model and the measurement curve derived therefrom to the actual joint course with great accuracy.

Furthermore, a laser machining head having a housing through which a work laser beam path is directed with collimating optics and focusing optics is provided with a device for carrying out the method according to the invention, the device comprising a camera for capturing images of a joint of workpieces, the viewing beam path of which being coaxially coupled into the work laser beam path, and an illumination device, the illumination beam path of which being coaxially coupled into the viewing beam path and into the work laser beam path.

Due to the illumination of the workpiece or the workpieces being coaxial to the viewing beam path, high-contrast images of the joint can be captured from which measurement data of the joint can be determined with an already reduced number of outliers.

Appropriately, the viewing beam path of the camera and the illumination beam path of the illumination device are coupled into a portion of the work laser beam path between the collimating optics and the focusing optics.

In an advantageous development of the invention, the illumination device is provided with an LED light source and collimating optics, wherein the LED light source has an LED board comprising an LED chip with integrated lens and a lens with high numerical aperture.

In order to achieve high contrast in the captured images of the joint, the LED light source is provided with a high-power LED, and an absorber is arranged, in beam direction, downstream of a partially transmissive mirror for coupling the illumination beam path of the illumination device into the viewing beam path of the camera.

In order to minimize disadvantageous reflections in the viewing beam path of the camera, a diaphragm for aperture adjustment is provided in the viewing beam path of the camera.

BRIEF DESCRIPTION OF THE DRAWINGS

The invention will be described in more detail below, for example, with reference to the drawing. In the figures.

DETAILED DESCRIPTION OF THE INVENTION

Figure 1A:
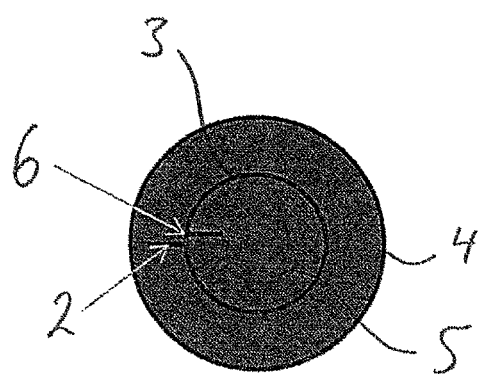
FIG. 1a shows a simplified schematic plan view of two workpieces for illustrating a joining position determination by means of triangulation methods.
Figure 1B:
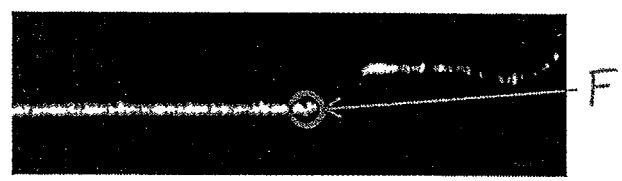
FIG. 1b shows an image of a laser line projected over a joining gap between the workpieces.
Figure 2A:
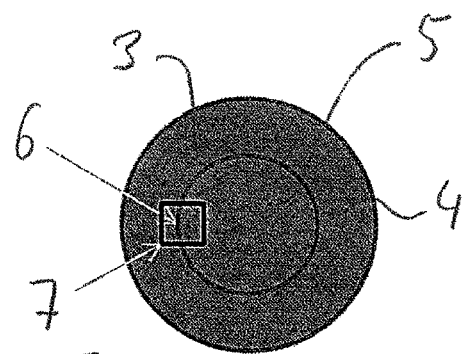
FIG. 2a is a simplified schematic plan view of two workpieces for illustrating the joining gap recognition by means of a captured gray image.
Figure 2B:
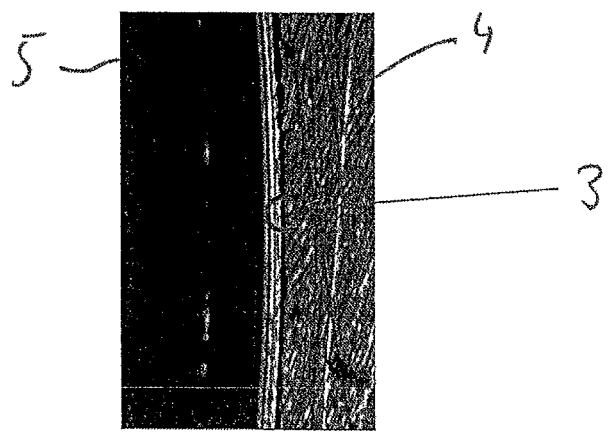
FIG. 2b shows a captured gray image of a joint between two workpieces.

In the various figures of the drawing, matching components are provided with the same reference signs.

Figure 4:
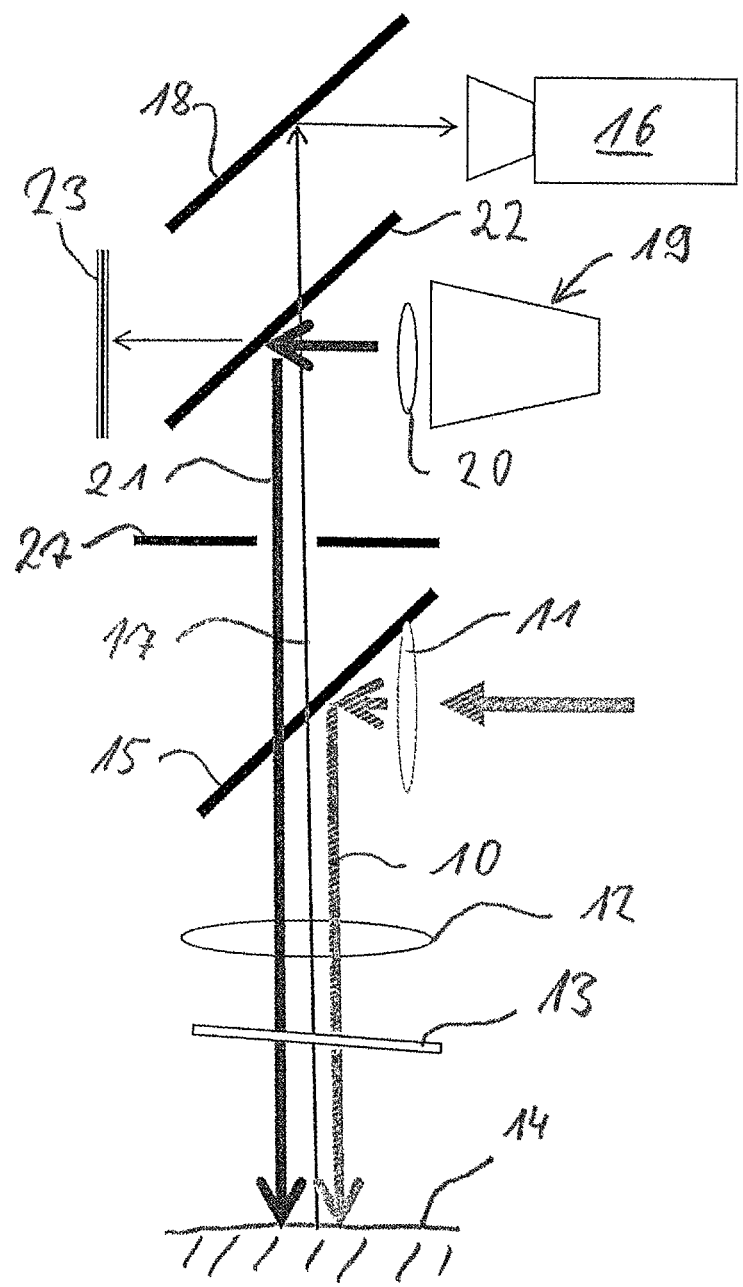
FIG. 4 shows a simplified schematic representation of a laser machining head with integrated device for identifying joining positions of workpieces.

FIG. 4 shows the schematic structure of a laser machining head with its housing omitted for the sake of simplicity. Through the laser machining head, a work laser beam path 10 is guided by a collimating optics 11 and a focusing optics 12. The focusing optics 12 focuses the work laser beam, in a manner not shown, through a protective glass 13 into the interaction region between laser radiation and a workpiece 14 for machining thereof. In the work laser beam path 10, additionally a partially transmissive deflection mirror 15 that is opaque to the work laser radiation, but transmissive for other wavelengths used for the observation of the workpiece surface, is arranged.

For imaging the workpiece surface to detect joining positions, a camera 16 with a lens is provided, the viewing beam path 17 of which being coupled coaxially into the working laser beam path 10 via a deflecting mirror 18 and through the partially transparent deflecting mirror 15. For high-contrast visualization or imaging of joining positions, an illumination device 19 with a collimating optics 20 is provided, the illumination beam path 21 of which being coupled coaxially into the viewing beam path 17 of the camera 16 and the work laser beam path 10 via a splitter mirror 22.

Since the splitter mirror 22 is required to be partially transmissive for the light emitted from the illumination device 19, i.e., needs to both transmit and reflect the respective wavelength of, e.g., 660 nm, an absorber 23 is arranged behind the partially transmissive mirror 22 in the beam direction in order to avoid disadvantageous reflections within the laser machining head which are otherwise generated by the illumination light not usable for illumination and partly directed to the camera 16. Furthermore, in the viewing beam path 17 of the camera 16, a diaphragm 27 for aperture adjustment and/or limitation by which back-reflections and reflections from the region of the protective glass 13 and the focusing lens 12 are at least partially shielded is arranged.

For a bright, high-contrast image, sufficient intensity from the illumination device 19 must be available and back-reflections must be minimized.

Therefore, preferably high-power LEDs having a large chip area (typ. 1×1 mm$^2$) and a large aperture angle (up to 160°) are used as LED light source. In order to collimate as much of the emitted light as possible, a combination of lenses is required, which in some cases must have high NA. In addition, the losses at the optical elements must be kept low.

Figure 5:
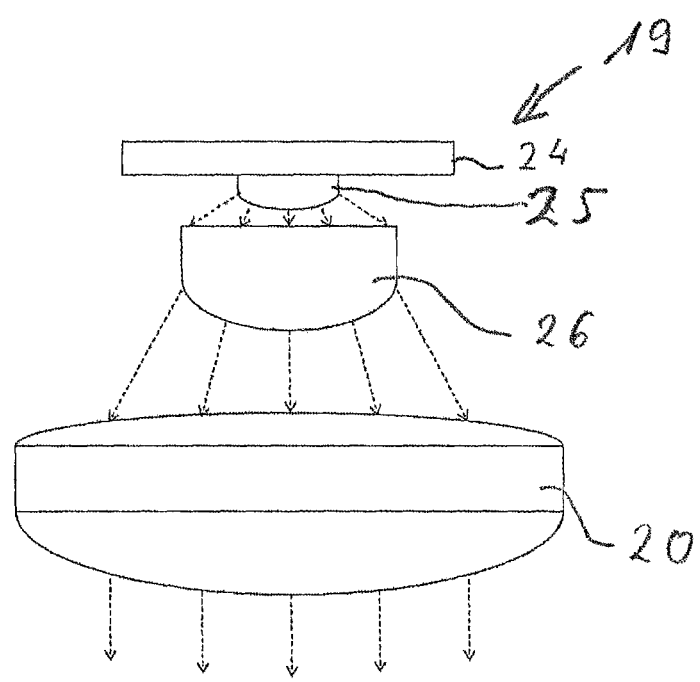
FIG. 5 is a detailed view of the illumination device shown in FIG. 4.

A lens combination that collimates as much light as possible and directs it through the laser machining head is shown in FIG. 5. Here, the lighting device 19 further comprises an LED light source with an LED board 24 on which an LED chip 25 with integrated lens such as a high-power LED is disposed and a lens 26 with high numerical aperture. The lens 26 with high numerical aperture serves to radiate as much of the illumination light emitted by the LED chip 25 with a large aperture angle into the collimating optics 20 as possible.

Due to the coaxial arrangement of the illumination LED, the illumination beam path 21 and the viewing beam path 17 largely take the same path, i.e., are coaxial. Each element in the common beam path producing a back-reflection reflected to the sensor of the camera 16 reduces the contrast of the image. As a result, a black picture will no longer be black, but gray.

It would be useful to provide each optical element with an optimal anti-reflective layer, which would allow for a transmission of almost 100% for the illumination wavelength, e.g., 660 nm. In many cases, however, this is not possible since the optical element needs to be anti-reflective-coated not only for the illumination wavelength, but also for the machining laser and possibly further sensors. The more requirements a coating needs to meet, the thicker and more complex the layer stack usually becomes, so that use in the machining beam path is often no longer possible due to the high laser power.

Figure 9:
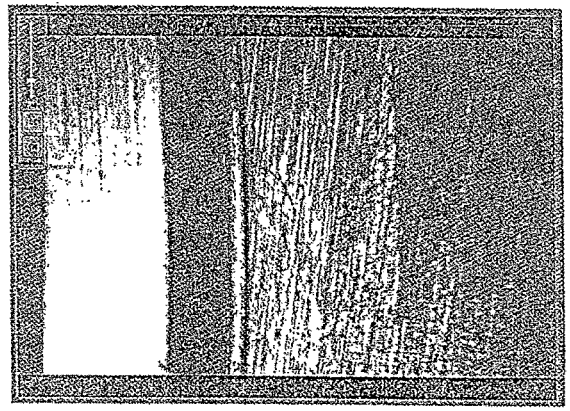
FIG. 9 is a low-contrast gray image of a joining gap.

Without optimizing the optics and the coating or orientation and position in the beam path thereof, the image is very low in contrast, as FIG. 9 shows, for example. Since the determination of the joining positions in the image is often performed by means of edge detection, sufficient contrast is absolutely required.

Due to the required contrast in the image and due to losses of illumination intensity due to poor reflection properties of the object field, i.e., the workpiece surfaces, and losses in the beam path of the laser machining head, high-power LEDs which are operated in a pulsed manner are preferably used. The pulses are synchronized with the capture of the image in the time window of the sensor exposure phase of the camera 16.

The following measures provide an optimal contrast in the image:

LED illumination by means of high-power LED with a lens combination to collimate as much emitted light as possible, as shown with reference to FIG. 5.

Coating of the focusing optics: Best possible anti-reflective coating for work laser radiation has priority, while an anti-reflective coating for illumination light should be designed as well as possible without adversely affecting the work laser wavelength.

Shape of the focusing optics 12: Curvature radii of the lens used should be adjusted such that the back-reflections present despite the anti-reflective coating on the front and back at 660 nm are reflected back so that the camera 16 is not significantly exposed. For this purpose, biconvex lens shapes are suitable. Despite the adjusted curvature radii, however, the focal length of the focusing optics 12 must be maintained.

Although it is possible, in principle, to provide the protective glass 13 with an anti-reflective coating for the illumination wavelength and the work laser, so that no back-reflections are generated, it is preferred to provide protective glass without special anti-reflective coating for 660 nm and tilt the protective glass by a few degrees, e.g., 4 degrees, so that the back-reflection does not directly hit the camera 16 and reduces the contrast. As a result, the back-reflection is no longer propagated coaxially and is blocked by the diaphragm 27 for aperture adjustment. There, the diaphragm 27 has an opening diameter which is smaller than that of the housing.

Figure 10:
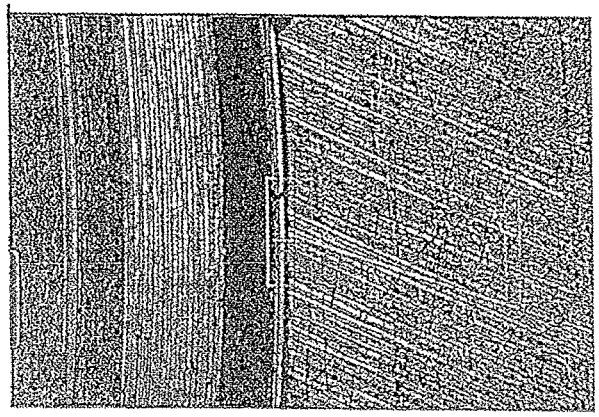
FIG. 10 shows a high-contrast gray image of the joining position captured using incident LED illumination according to the invention.

A high-contrast imaging of the joining position with the described coaxial incident LED illumination is shown in FIG. 10.

Figure 6:
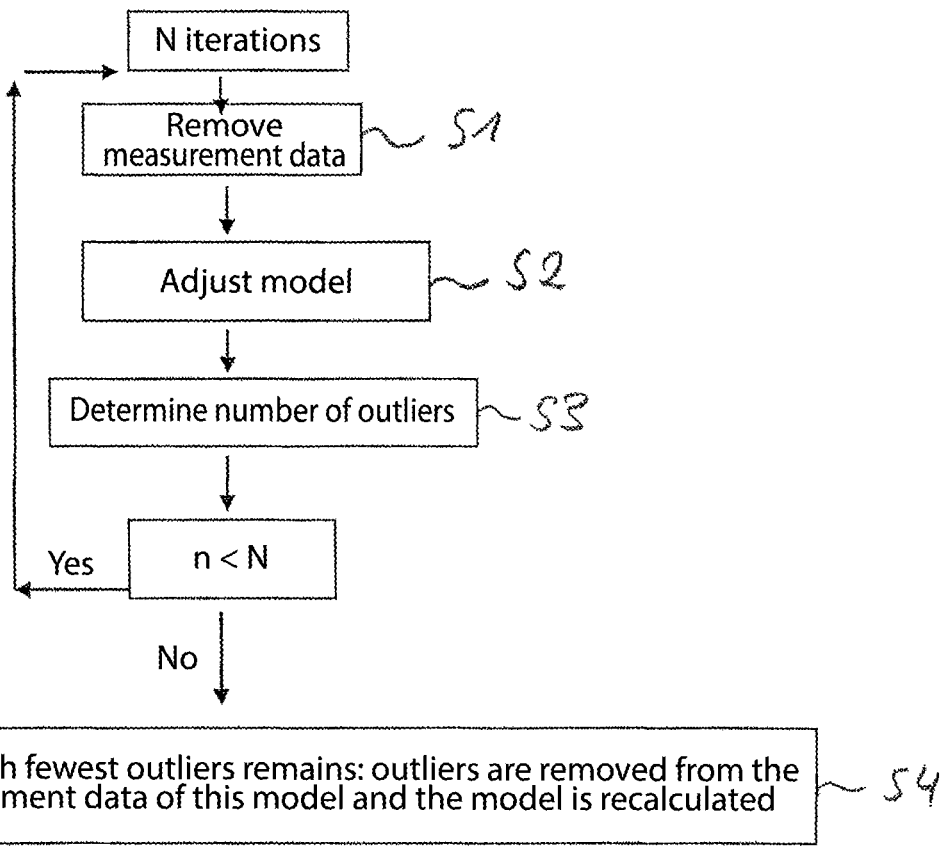
FIG. 6 is a flow chart of the determination of a model of a joint course.

FIG. 6 shows a flow chart of the method for determining a measurement curve from the measurement data for the joining positions associated with the curse of the joint, the measurement curve then being used to control a joining process and to determine further quality characteristics. For this purpose, N iterations are carried out, with measurement data first being removed from the measurement data associated with the course of the joint in step S1. The model is then fitted to the reduced measurement data set in a step S2, in order to then determine the number of outliers for this fitted model in step S3. It is therefore determined which of the individual measurement data points of a measurement data set deviates more than a predetermined error bound from the calculated model. As long as the number n of iterations carried out is smaller than the predetermined number N, the next iteration is carried out in the same way, respectively.

After all N iterations have been carried out, the model with the fewest outliers is selected in a last step S4. From the measurement data for this model, the outliers are removed and the model is finally recalculated. The resulting model then provides the measurement curve from which further quality characteristics may be determined and which may also be used to control the joining process.

The method uses the iterative fitting of a model to parts of all the original measurement data representing a measurement curve corresponding to the course of the joint. In particular, a modified Ransac method is used to determine joining positions.

For this purpose, a mathematical model is to be fitted to the measurement data set and outliers are not to be considered. The features to be determined, e.g., the joining position and quality characteristics determined therefrom such as maximum deviation or concentricity should therefore not be based on the original data but on the data from the mathematical model.

For example, a 4th degree polynomial serves as a mathematical model. The measurement data set should therefore be approximated with the model $Y=A+B*x+C*x^2+D*x^3+E*x^4$. As a result, the algorithm provides a polynomial with the coefficients A, B, C, D, and E in which outliers are eliminated. If one can assume that the course deviations are caused by translations of the center, the equation $Y(x)=A+B*\sin(C*x+D)$ may also be used as a model.

After a sufficient number N of iterations, an optimal model can be found.

The removal of part of the measurement data in each iteration is not random, since disturbances in the image which lead to outliers usually have a component-dependent length. The random removal of data would mean a high number of iterations.

Figure 7A:
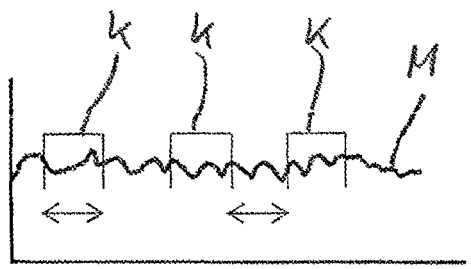
FIG. 7a is a schematic diagram for illustrating measurement data associated with the course of a joint and a comb profile for removing a part of these measurement data.

FIG. 7a shows an exemplary pattern (comb profile K) used to remove a part of the measurement data from the measurement data set representing the original measurement curve M. The distance and the range of the windowed data removal from the original measurement data set may be parameterized depending on the component. The method used to remove data is component-dependent.

Figure 7B:
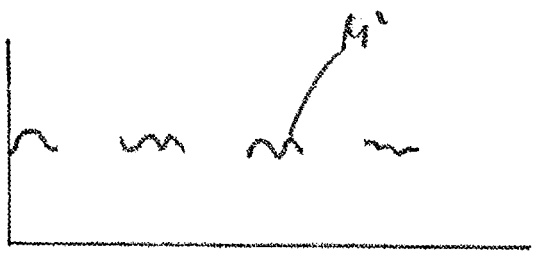
FIG. 7b shows a diagram for illustrating a measurement data set after removing a part thereof according to FIG. 7a, FIG. 8a is a diagram for illustrating measurement data representing the course of a joint after supplementing missing joining positions by linear interpolation.

A measurement data set obtained by removing data according to the comb profile K shown in FIG. 7a would be represented by the measurement curve M' shown in FIG. 7b, for example.

From this measurement data set, the model is calculated and the number of outliers determined. With each iteration, a model will emerge, with other coefficients in the case of a polynomial. Outliers may be determined for every model fitted to the measurement data set, i.e., the calculated polynomial. The shape of the model can be restricted in most cases because there is prior knowledge of the measurement curve. In a component with an axial joining gap arrangement, the course of the joining position will be along a circle. Errors due to non-concentric clamping of the components can be described by a trigonometric model.

Figure 3:
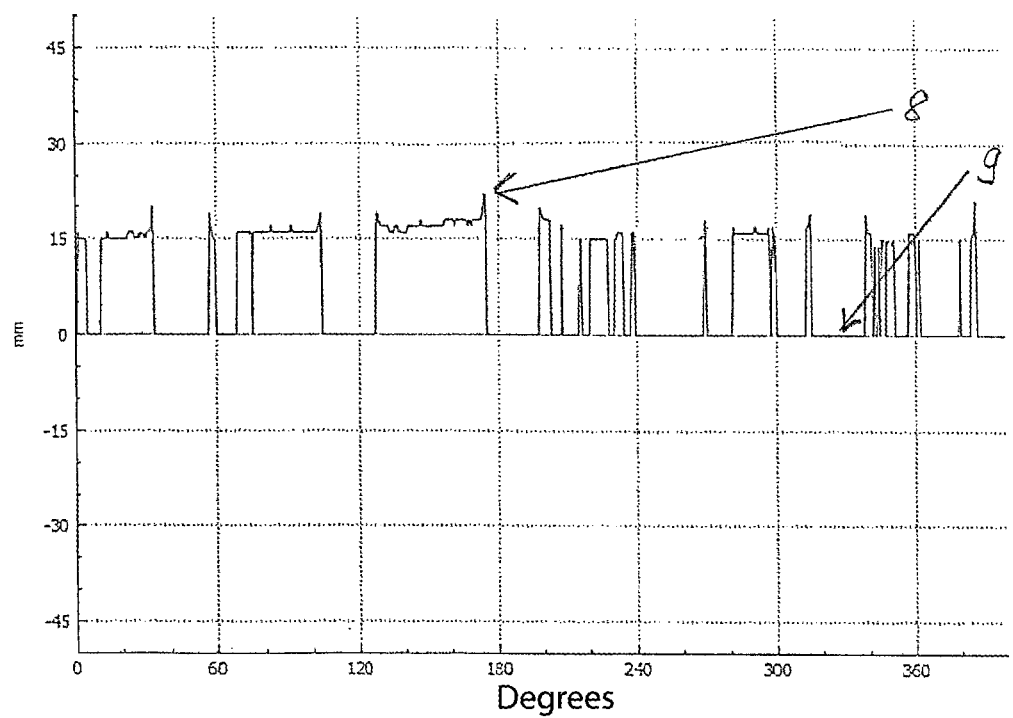
FIG. 3 is a diagram illustrating the joining gap positions detected in the gray image over the entire course of the joining gap.
Figure 8A:
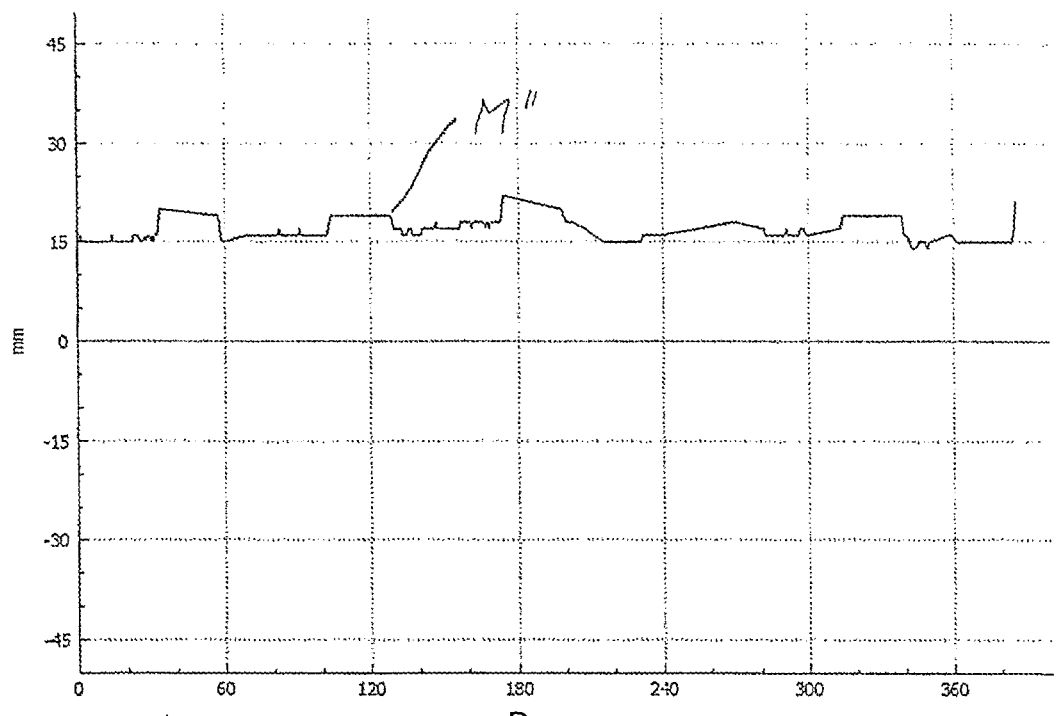
FIG. 8b shows a diagram for illustrating a model fitted to these measurement data.
FIG. 8c is a diagram illustrating a model fitted to these measurement data after removing outliers from measurement data.

FIG. 8a shows the measurement curve M" of a measurement data set after linearly interpolating non-detected positions along a course of an axial joining gap (see the regions 9 in FIG. 3). Non-detected positions may be implausible measurement data, such as values on the left or right ROI edge.

Figure 8B:
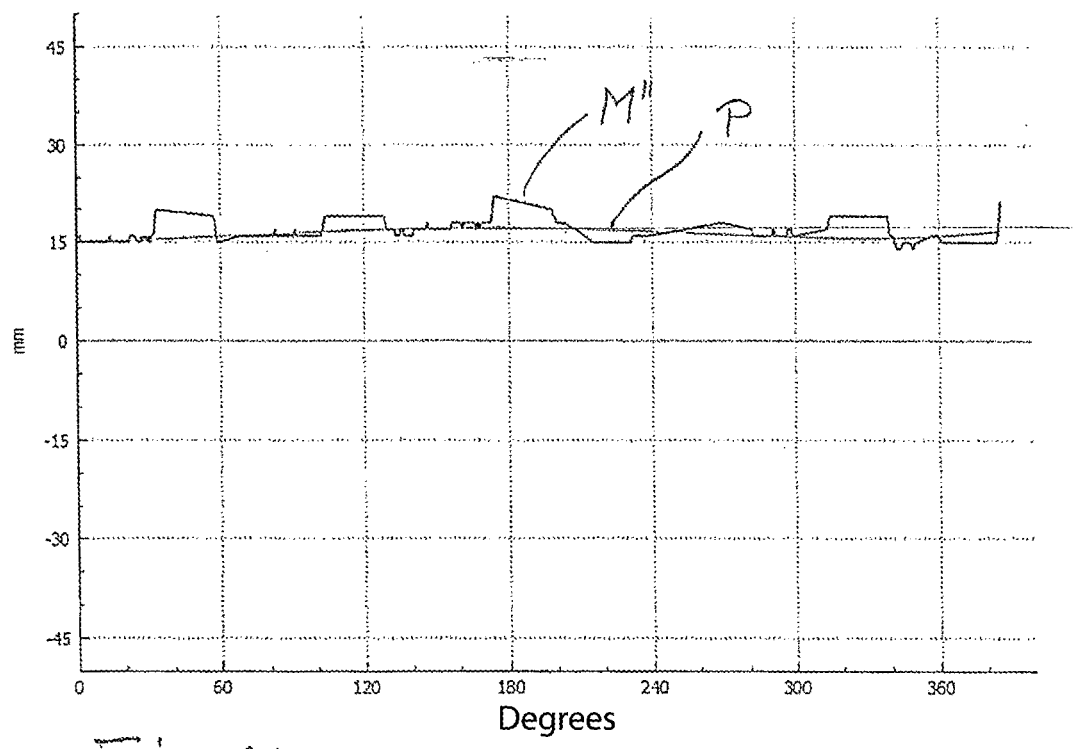

FIG. 8b shows a calculated model P, for example a 4th degree polynomial on the measurement data set according to FIG. 8a above. The maximum is 17.57 mm.

Figure 8C:
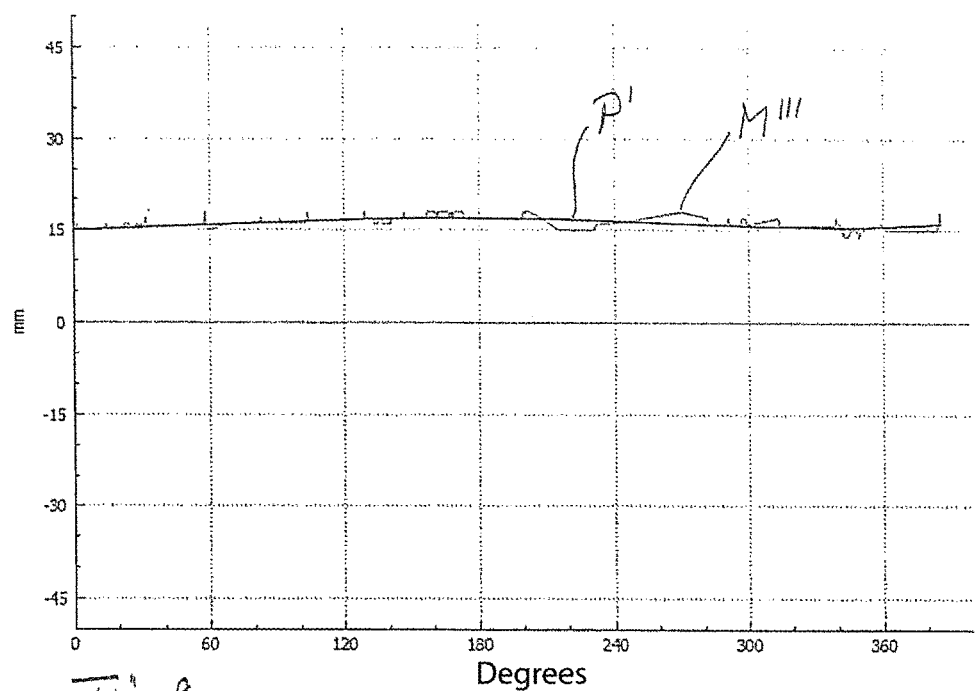

After 10 iterations and cleanup of the measurement data set, the maximum is 16.97 mm. A concentricity of an axial joining gap course calculated for the measurement curve M''' shown in FIG. 8c thus reliably matches the actual course of the joining gap between the workpieces.

The method according to the invention may also be applied to the recognition of the welding seam in the gray image. Again, there is the problem that the contour of the welding seam in the gray image suffers from outliers, depending on the detection method. The adapted method described here can also safely detect the seam edges in the gray image. For this purpose, the respective mathematical model is fitted to the expected course of the seam.

Thus, with the method according to the invention, the outliers and gross errors can be reliably eliminated and a measurement curve of the joining gap positions along the joining path can be generated. With this generated curve, the quality, e.g., the concentricity, of the joining gap course can be reliably assessed. This curve can be used to position the welding laser along this curve during welding.

According to the invention, the visualization or imaging of the joining position is achieved with a coaxial camera 16 and a coaxial LED illumination. The optical filters used, the deflecting mirrors, the protective glass and the focusing optics of the welding head are adapted to the wavelength of the LED such that reflections at the optics in the common beam path of the LED illumination 21 and the viewing beam path 17 into the camera 16 are minimized. This is achieved either by adapted coatings or by clever positioning of the components and suitable apertures. Avoiding disadvantageous reflections allows for a high-contrast image.

The invention claimed is:

1. A method for identifying joining positions of workpieces prior to welding, comprising the steps of:
   capturing images of a joint by means of a camera;
   determining measurement data for the joining positions associated with a course of the joint from the images of the joint;
   removing some of the measurement data from the measurement data associated with the course of the joint, the removing depending on components to be welded and being not random;
   fitting a mathematical model of the joint course to the measurement data after the removing step;
   providing a curve defined by the mathematical model; and
   positioning a welding laser during a laser welding process along said curve.

2. The method according to claim 1, further comprising illuminating the workpieces coaxially to a viewing beam path of the camera.

3. The method according to claim 1, wherein a viewing beam path of the camera for capturing the images of the joint is coaxially coupled into a beam path of a laser beam used for welding.

4. The method according to claim 1, wherein the step of the removing some of the measurement data from the measurement data associated with the course of the joint comprises removing some of the measurement data using a comb profile having spaced apart windows, a width of the windows and distances thereof in said comb profile being selected according to the workpieces.

5. The method according to claim 1, further comprising:
   supplementing unidentified joining positions in the course of the joint by linear interpolation.

6. The method according to claim 1,
   wherein the steps of removing and fitting are repeatedly performed, and the method further comprising determining a number of outliers for each fitted model.

7. The method according to claim 6, further comprising removing from the measurement data the outliers that have been determined for the fitted model with the fewest outliers, and redetermining the mathematical model by fitting to the measurement data after removing the outliers that have been determined for the fitted model with the fewest outliers.

8. A laser machining head comprising a housing through which a working laser beam path with a collimating optics and a focusing optics is provided, and a device, which is configured for performing the method according to claim 1 comprises:
   a camera for capturing images of a joint of workpieces, a viewing beam path of which being coaxially coupled into a working laser beam path; and
   an illumination device, an illumination beam path which is coaxially coupled to the viewing beam path and the working laser beam path,
   wherein the device is configured for;
      obtaining measurement data for the joining positions from the images of the joint,
      removing some of the measurement data from the measurement data associated with a course of the joint and fitting a mathematical model of the joint course to the measurement data after the removing step, the removing depending on components to be welded and being not random, wherein the mathematical model provides a curve for positioning a welding laser during a laser welding process along said curve.

9. The laser machining head according to claim 8, wherein the viewing beam path of the camera and the illumination beam path of the illumination device are coupled into a portion of the working laser beam path between the collimating optics and the focusing optics.

10. The laser machining head according to claim 8, wherein the illumination device includes an LED light source and a collimating optics.

11. The laser machining head according to claim 10, wherein the LED light source includes an LED board having an LED chip with integrated lens, the LED light source further includes a lens with a numerical aperture adapted to an aperture angle of the emitted illumination light.

12. The laser machining head according to claim 11, wherein the LED light source comprises a LED, and that an absorber is arranged, in the beam direction, downstream of a partially transmissive mirror for coupling the illumination beam path of the illumination device into the viewing beam path of the camera.

13. The laser machining head according to claim 8, further comprising a diaphragm for adjusting the aperture disposed in the viewing beam path of the camera.

14. A method for identifying joining positions of workpieces prior to welding, comprising the steps of:
   capturing images of a joint by means of a camera;
   determining measurement data for the joining positions associated with a course of the joint from the images of the joint;
   determining a 4th degree polynomial as a mathematical model of the joint course by fitting to a part of the measurement data;
   providing a curve defined by the mathematical model; and
   positioning a welding laser during a laser welding process along said curve removing some of the measurement data from the measurement data associated with the course of the joint, the removing depending on components to be welded and being not random; and
   wherein the step of determining the mathematical model of the joint course comprises; fitting the mathematical model of the joint course to the measurement data after the removing step; and wherein the step of the removing some of the measurement data from the measurement data associated with the course of the joint comprises removing some of the measurement data using a comb profile having spaced apart windows, a width of the windows and distances thereof in said comb profile being selected according to the workpieces.

15. The method according to claim 14, further comprising illuminating the workpieces coaxially to a viewing beam path of the camera.

16. The method according to claim 14, wherein a viewing beam path of the camera for capturing the images of the joint is coaxially coupled into a beam path of a laser beam used for welding.

17. The method according to claim 14, further comprising supplementing unidentified joining positions in the course of the joint by linear interpolation.

18. The method according to claim 14, wherein the steps of removing and fitting are repeated performed, and the method further comprising determining a number of outliers for each fitted model.

19. The method according to claim 18, further comprising removing from the measurement data the outliers that have been determined for the fitted model with the fewest outliers, and redetermining the mathematical model by fitting to the measurement data after removing the outliers that have been determined for the fitted model with the fewest outliers.

* * * * *